United States Patent

[11] 3,545,561

[72] Inventors Woody Bradley
P.O. Box 955, Winton, 95388;
Zack R. Keck, 16389 Avenue 184,
Strathmore, California 93267
[21] Appl. No. 797,108
[22] Filed Feb. 6, 1969
[45] Patented Dec. 8, 1970

[54] AIR COMPRESSOR SYSTEM FOR SERVICE TRUCK
11 Claims, 1 Drawing Fig.
[52] U.S. Cl. .................................................. 180/53,
123/98; 180/1, 180/54, 184/6; 230/38
[51] Int. Cl. ...................................................... B60k 25/02
[50] Field of Search ........................................ 180/53,
54(A); 230/33, 38, 51; 123/198(C); 62/244

[56] References Cited
UNITED STATES PATENTS
2,627,371  2/1953  Bernal ......................... 123/198(C)UX
2,656,000  10/1953  Drinkard ..................... 180/54(A)UX
3,306,067  2/1967  Anglin ......................... 62/244X

*Primary Examiner*—A. Harry Levy
*Attorney*—Huebner & Worrel

ABSTRACT: An air compressor apparatus mounted on an automotive vehicle in a manner which does not occupy load space thereon and includes a compressor unit and an accumulator with a quick coupling attachment air outlet. The unit is mounted on the vehicle engine and is driven thereby through pulleys and a magnetic clutch. Air is drawn into the unit through the air cleaner of the engine and delivered by an air line to the accumulator which is housed in a fender well or the like. The clutch is energized by circuitry including switches on an instrument panel in the operator's cab and a pressure responsive switch in the air line. The unit is lubricated by an oil line connected with the oil circulating system of the engine.

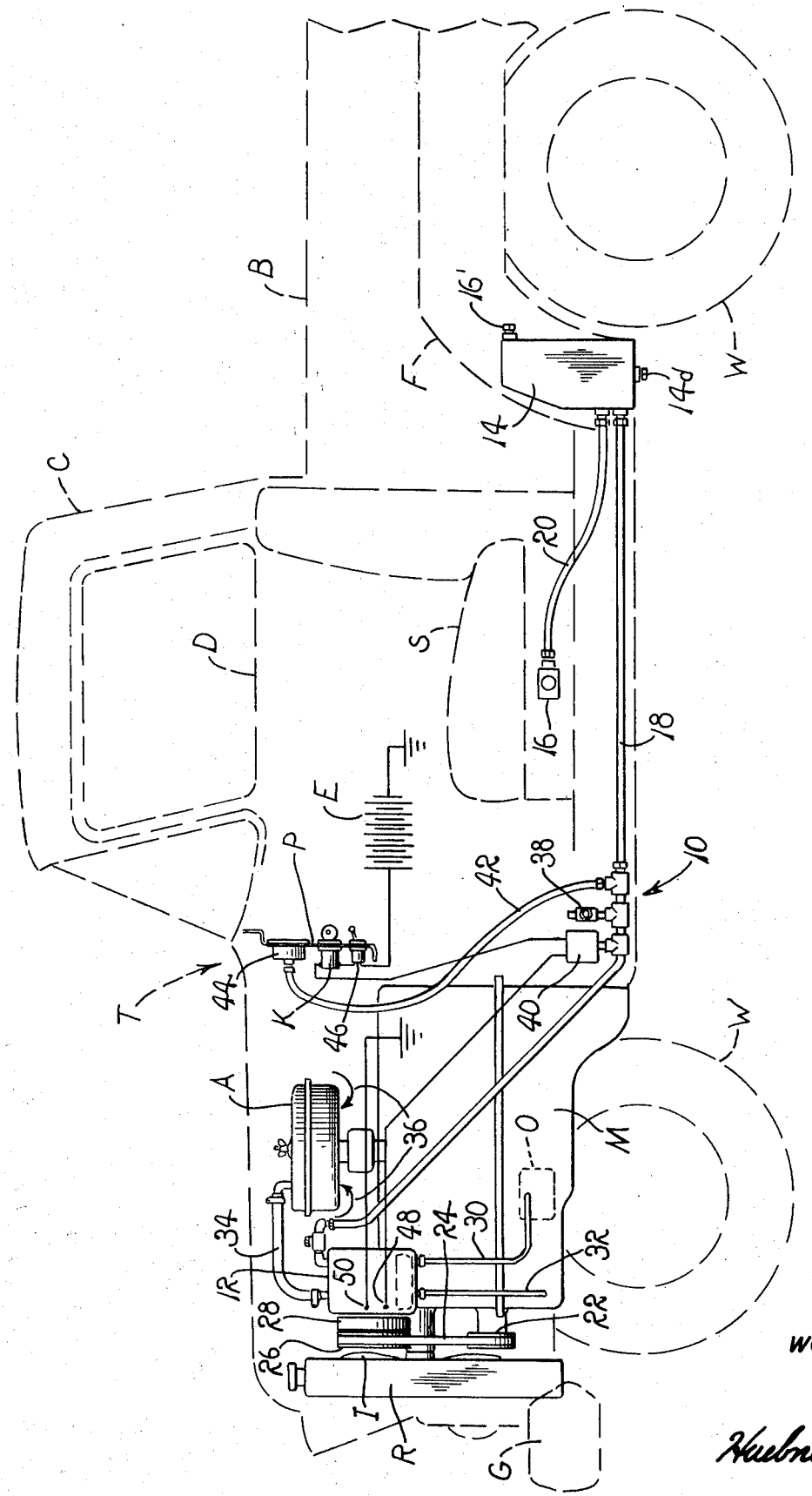

AIR COMPRESSOR SYSTEM FOR SERVICE TRUCK

BACKGROUND OF THE INVENTION

The present invention relates to air compressor systems and more particularly to an air compressor apparatus adapted to be supported on an automotive vehicle such as a service truck or the like in a manner which does not take up load space in the truck body and thereby limit its use for hauling purposes.

Air compressor systems have been proposed for automotive vehicles to provide a portable source of pneumatic power. Heretofore, such systems have in the main been somewhat bulky and carried on the vehicle in a manner which takes up valuable load space, thereby reducing the hauling capacity of the vehicle and otherwise minimizing its versatility for hauling purposes.

SUMMARY OF THE INVENTION

It is therefore an object of the present invention to provide an air compressor apparatus for a service truck which does not occupy the load space in the body of the truck.

Another object is to provide an air compressor apparatus for a service truck having parts located in out-of-the-way places on the truck.

Another object is to provide an air compressor apparatus of compact and relatively simple construction which is operatively related to the engine and other parts of the truck.

Another object is to provide an air compressor apparatus which operates in a safe and reliable manner without reducing the load carrying capabilities of the truck.

These and other objects and advantages are achieved by an air compressor apparatus which is mounted on and carried by a service truck and includes a compressor unit mounted proximate to the truck engine and driven thereby through pulleys and a magnetic clutch. Oil for lubricating the compressor unit is furnished by the oil circulating system of the engine. Clean air is drawn into the compressor unit through the engine air cleaner and compressed air is delivered via an air line to an accumulator hidden in a fender well. An airhose extends from the accumulator to a quick coupling attachment air outlet located under the seat of the truck operator and accessible for connection of airpowered tools by opening the adjacent truck door. The magnetic clutch is energized by circuitry including a pressure responsive switch connected to the air line between the compressor unit and the accumulator and switches on the instrument panel of the truck, the several switches being series connected. Also connected to the air line is a safety valve and an airhose which terminates at a pressure gauge on the instrument panel.

BRIEF DESCRIPTION OF THE DRAWING

The single FIG. is a side elevation of the air compressor apparatus of the present invention shown mounted on a service truck, portions of which are shown fragmentarily and schematically.

DESCRIPTION OF THE EMBODIMENT

Referring to the drawing, there is shown an air compressor apparatus 10 which includes an air compressor unit 12, an accumulator 14 and a compressed air outlet 16. The accumulator is connected to the compressor unit by an air line 18 and to the air outlet by an airhose 20.

In accordance with the present invention, the air compressor apparatus is adapted to be mounted on a service truck T having a load carrying body B, an operator's seat C with doors D providing access to an operator's seat S and an instrument panel P. The truck is supported on wheels W partly encased in mudguards or fenders F. The truck is powered by an engine or motor M cooled by a radiator R and fan or air impeller I protected by a bumper and grill G. The engine M is of conventional type connected to a battery E through a key-controlled switch K. The engine has an oil system with an oil filter O and an air cleaner A through which air is drawn by the engine.

The air compressor unit 12 is suitably supported proximate to the engine M and is driven therefrom by a pulley 22 and a belt 24, the belt being entrained about the pulley and about a sheave 26 which is operatively connected to a magnetic clutch 28. The magnetic clutch is operatively related to the unit 12 and serves to operate the same when the clutch is energized and the sheave is rotated. The pulley can conveniently take the form of the drive pulley usually mounted on the crank shaft of the engine M. Oil for lubricating the unit 12 is delivered through an oil line 30 which interconnects the unit and the oil filter O, the oil being returned to the oil sump in the engine M by a pipe 32.

During operation of the air compressor unit 12, clean air is drawn in through an air hose 34 interconnecting the unit with the interior of the air cleaner A. Air removed from the air cleaner is replaced by outside air which enters the air cleaner as indicated by the arrows 36 and is cleansed during the process of entry.

The air drawn in by the unit 12 is compressed thereby and forced through the air line 18 to the accumulator 14 which is conveniently housed in the well of a fender F or out-of-the-way places. Connected to the air line 18 are a safety valve 38, a pressure responsive switch 40 and an airhose 42 terminating at a pressure gauge 44 on the instrument panel P. The pressure responsive switch 40 is series connected with the key-operated switch K and a toggle type on-off switch 46 mounted on the panel P and connected to one side of the battery E. The other side of the battery is grounded. The pressure responsive switch is also connected to a terminal 48 at one end of an energizing mechanism, not shown, for the magnetic clutch, the other end of which has a terminal 50 which is grounded for completing the circuit to the other side of the battery. Thus, with switches 46 and K closed, when the pressure in the air line 18 falls below a predetermined value, switch 40 is placed in closed condition and the magnetic clutch is energized for operation of the compressor unit by the engine. However, when the pressure in the air line goes above a predetermined value, the switch 40 is pressured to open position, deenergizing the magnetic clutch and stopping operation of the compressor unit.

The accumulator 14 can be provided with a moisture drain plug 14d and an auxiliary air outlet 16′. The air outlets 16′ and 16 are preferably of the quick couple attachment type for the attachment of air operated tools such as impact wrenches or the like. The air outlet 16 is conveniently located under the seat S with ready access thereto by opening the adjacent door D.

OPERATION

The operation of the apparatus of the present invention is believed to be clearly apparent and is briefly summarized at this point. With the switch 46 in the off position, the engine M is started by turning the key-operated switch K, after which the switch 46 is moved to closed position, thus energizing the magnetic clutch 28. With the clutch energized, the compressor unit 12 operates to draw in clean air and force compressed air through the air line 18 to the accumulator 14 until pressure in the air line builds up to a proper level, after which the pressure responsive switch 40 opens and the clutch is deenergized stopping operation of the unit 12. Air-operated tools can be connected to the air outlets 16 and 16′ to perform the tasks at hand. When it is desired to shut off the air compressor apparatus, the switch 46 is moved to off position. The tools are then disconnected and stored.

There has thus been provided an air compressor apparatus for a service truck which is of compact and simple construction with the parts thereof mounted on the truck in out-of-the-way places so as to leave available for hauling purposes the load space body of the truck.

Although the invention has been herein shown and described in what is conceived to be the most practical and preferred embodiment, it is recognized that departures may be made therefrom within the scope of the invention, which is not

We claim:

1. An air compressor apparatus supported on an automotive vehicle having a load space body and an engine in a manner avoiding impairment of the load carrying capacity of the body, said apparatus comprising a compressor mounted proximate to the engine, means for driving the compressor from the engine including a magnetic clutch, an accumulator mounted on the vehicle exteriorly of the vehicle body, an air line interconnecting the accumulator and the compressor, and means for energizing the magnetic clutch including a pressure responsive switch connected to the air line.

2. The apparatus of claim 1 in which the engine has an air cleaner, and air is drawn into the compressor through the air cleaner.

3. The apparatus of claim 1 in which the engine has an oil circulating system, and means interconnecting the compressor with the oil system for lubricating the compressor.

4. The apparatus of claim 1 in which the engine is controlled by a key-operated switch which is connected in series with the pressure responsive switch.

5. The apparatus of claim 4 in which an on-off switch is connected in series with the key-operated switch and the pressure responsive switch.

6. The apparatus of claim 1 in which the vehicle has a fender, and the accumulator is mounted out of sight within the fender.

7. The apparatus of claim 1 in which the accumulator is connected to an air hose having a quick coupling air outlet attachment at the end thereof.

8. The apparatus of claim 7 in which the vehicle has an operator's cab with a door, and the attachment is located in the cab and is accessible by opening the door.

9. The apparatus of claim 8 in which a pressure indicator is located in the cab, said indicator being connected to the air line.

10. The apparatus of claim 1 in which the engine is controlled by a key-operated switch and has an air cleaner and an oil system, the compressor has an air intake connected to the air cleaner and lubricating lines connected to the oil system, and said key-operated switch is connected in series with the pressure responsive switch.

11. In combination with an internal combustion engine having a drive pulley, an air cleaner and an oil lubricating system;

A. an air compressor having;
 1. an intake connected to the air cleaner;
 2. an outlet;
 3. a drive sheave; and
 4. a lubricating system connected to the lubricating system of the engine;
B. a drive belt interconnecting the pulley of the engine and the sheave of the compressor; and
C. an accumulator connected to the outlet of the compressor.